(12) United States Patent
Antonietti et al.

(10) Patent No.: US 8,481,642 B2
(45) Date of Patent: Jul. 9, 2013

(54) PROCESS FOR THE PREPARATION OF HYDROTHERMAL HYBRID MATERIAL FROM BIOMASS, AND HYDROTHERMAL HYBRID MATERIAL OBTAINABLE BY THE PROCESS

(75) Inventors: Markus Antonietti, Bergholz-Rehbruecke (DE); Maria Magdalena Titirici, Berlin (DE); Rezan Demir Cakan, Berlin (DE)

(73) Assignee: CSL Carbon Solutions Ltd., St. Helier, NJ (US)

( * ) Notice: Subject to any disclaimer, the term of this patent is extended or adjusted under 35 U.S.C. 154(b) by 120 days.

(21) Appl. No.: 13/000,930

(22) PCT Filed: Jun. 22, 2009

(86) PCT No.: PCT/EP2009/057721
§ 371 (c)(1),
(2), (4) Date: Jan. 19, 2011

(87) PCT Pub. No.: WO2010/006881
PCT Pub. Date: Jan. 21, 2010

(65) Prior Publication Data
US 2011/0112246 A1    May 12, 2011

Related U.S. Application Data

(60) Provisional application No. 61/074,767, filed on Jun. 23, 2008.

(30) Foreign Application Priority Data
Jun. 23, 2008 (EP) .................................... 08011342

(51) Int. Cl.
*C08F 2/16* (2006.01)
*C08K 11/00* (2006.01)

(52) U.S. Cl.
USPC ........... 524/800; 523/129; 524/803; 524/804; 524/809; 524/812; 524/827; 524/832

(58) Field of Classification Search
USPC ......................................................... 523/129
See application file for complete search history.

(56) References Cited

U.S. PATENT DOCUMENTS

| 4,098,765 A | 7/1978 | Kays et al. |
| 4,200,723 A | 4/1980 | Chen |

(Continued)

FOREIGN PATENT DOCUMENTS

| CN | 1737029 A | 2/2006 |
| EP | 1 857 532 A1 | 11/2007 |

(Continued)

OTHER PUBLICATIONS

Ri et al., Computer generated English translation of JP 2007-055825 A, Mar. 8, 2007.*

(Continued)

*Primary Examiner* — Peter F Godenschwager
*Assistant Examiner* — David Karst
(74) *Attorney, Agent, or Firm* — Scully, Scott, Murphy & Presser, P.C.

(57) ABSTRACT

The present invention relates to a process for the preparation of hydrothermal hybrid material, in particular coal-like hybrid material from biomass. The process involves the heating of a reaction mixture comprising water, biomass and a copolymerizable compound, wherein the copolymerizable compound is added when preparing the reaction mixture, in a variant of the process, the biomass is converted to activated biomass in a first step, and the copolymerization of the activated biomass and a copolymerizable compound to give the hydrothermal, preferably coal-like, hybrid material is started by adding a polymerization initiator. The invention also relates to the hydrothermal hybrid materials obtainable by the processes as such, e.g. to aqueous dispersions thereof. By incorporating copolymerizable compounds, e.g. petrochemical compounds in the structure of the hydrothermal hybrid materials, the physical properties of the materials and the preparation process thereof can be controlled.

18 Claims, 3 Drawing Sheets

U.S. PATENT DOCUMENTS

| | | | |
|---|---|---|---|
| 4,201,699 A | | 5/1980 | Chen |
| 4,201,700 A | | 5/1980 | Chen |
| 4,201,851 A | | 5/1980 | Chen |
| 4,301,017 A | * | 11/1981 | Kightlinger et al. ......... 252/8.83 |
| 4,425,256 A | | 1/1984 | Pilipski |
| 5,194,069 A | | 3/1993 | Someus |
| 2007/0138105 A1 | * | 6/2007 | Takeda et al. ................. 210/702 |
| 2008/0006518 A1 | | 1/2008 | Shimojo et al. |
| 2010/0162619 A1 | * | 7/2010 | Peus ............................... 44/605 |

FOREIGN PATENT DOCUMENTS

| | | |
|---|---|---|
| FR | 2 556 344 A1 | 6/1985 |
| JP | 2007055825 A * | 3/2007 |
| WO | 01/59008 A1 | 8/2001 |
| WO | 2007/104798 A2 | 9/2007 |
| WO | 2008/081409 A2 | 7/2008 |

OTHER PUBLICATIONS

Schuhmacher, J. P. et al., "Chemical Structure and Properties of Coal XXVI—Studies on Artificial Coalification" *Fuel* (1960) pp. 223-234, vol. 39.

Wang, Q. et al., "Monodispersed Hard Carbon Spherules with Uniform Nanopores" *Carbon* (2001) pp. 2211-2214, vol. 39.

Sun, X. et al., "Colloidal Carbon Spheres and Their Core/Shell Structures with Noble-Metal Nanoparticles" *Angew. Chem. Int. Ed.* (2004) pp. 597-601, vol. 43.

Yu, S. H. et al., "From Starch to Metal/Carbon Hybrid Nanostructures: Hydrothermal Metal-Catalyzed Carbonization" *Advance Material* (2004) pp. 1636-1640, vol. 16.

Qian, H. S. et al., "Synthesis of Uniform Te@Carbon-Rich Composite Nanocables with Photoluminescence Properties and Cabonaceous Nanofibers by the Hydrothermal Carbonization of Glucose" *Chemical Material* (2006) pp. 2102-2108, vol. 18.

Titirici, M. M. et al., "Back in the Black: Hydrothermal Carbonization of Plant Material as an Efficient Chemical Process to Treat the $CO_2$ Problem?" *New Journal of Chemistry* (2007) pp. 787-789, vol. 31.

Deng, S. et al., "Fungal Biomass with Grafted Poly(acrylic acid) for Enhancement of CU(II) and Cd(II) Biosorption" *Langmuir* (2005) pp. 5940-5948, vol. 21.

Titirici, M. M. et al., "Aminated Hydrophilic Ordered Mesoporous Carbons" *Journal of Materials Chemistry* (2007) pp. 3412-3418, vol. 17.

Boehm, H. P., "Some Aspects of the Surface Chemistry of Carbon Blacks and Other Carbons" *Carbon* (1994) pp. 759-769, vol. 32(5).

Kruse, A. et al., "Biomass Conversion in Water at 330-410° and 30-50 MPa. Identification of Key Compounds for Indicating Different Chemical Reaction Pathways" *Industrial and Engineering Chemical Research* (2003) pp. 267-279, vol. 42.

European Examination Report, dated Nov. 8, 2012 from related European Application No. 09 797 452.1.

* cited by examiner

PROCESS FOR THE PREPARATION OF HYDROTHERMAL HYBRID MATERIAL FROM BIOMASS, AND HYDROTHERMAL HYBRID MATERIAL OBTAINABLE BY THE PROCESS

FIELD OF THE INVENTION

The present invention relates generally to a process for the preparation of hydrothermal hybrid material, in particular coal-like hybrid material, from biomass, more specifically to a hydrothermal preparation process using a starting reaction mixture comprising water, biomass and a copolymerizable compound. According to another aspect, the present invention relates to the hydrothermal hybrid material obtainable by the process, for instance in the form of an aqueous dispersion. In comparison to conventional hydrothermal coal-like material prepared from biomass, the (preferably coal-like) hybrid materials according to the invention offer advantages in that their properties can be adjusted as desired by using suitable kinds and amounts of copolymerizable compounds. Accordingly, the present invention also relates to the use of the copolymerizable compounds for the functionalization of hydrothermal materials. In addition, the hydrothermal carbonization process as such can be controlled by adding copolymerizable compounds to the starting reaction mixture.

BACKGROUND OF THE INVENTION

In the past, many efforts have been made to imitate the natural coalification of biomass, which takes place on a time scale of some hundred (peat) to hundred million (black coal) years. Besides the formation of charcoal by pyrolysis of dry biomass, the so-called hydrothermal carbonization (HTC) process for the manufacture of coal or coal-like materials has recently attracted increasing attention. The first experiments were carried out already in 1913 by Bergius, who described the hydrothermal transformation of cellulose into coal-like materials. More systematic investigations were later performed by E. Berl et al. (Ann. Chem., 493 (1932), pp. 97-123; Angew. Chemie 45 (1932), pp. 517-519) and by J. P. Schumacher et al. (Fuel, 39 (1960), pp. 223-234). Recently, the hydrothermal carbonization has seen a renaissance starting with reports on the low temperature hydrothermal synthesis of carbon spheres using sugar or glucose as precursors (Q. Wang et al., Carbon 39 (2001), pp. 2211-2214 and X. Sun and Y. Li, Angew. Chem., Int. Ed. 43 (2004), pp. 597-601). Furthermore, metal/carbon hybrid nanostructures, such as nanocables prepared by a hydrothermal carbonization co-reduction process using starch and noble metal salts such as $AgNO_3$ as starting materials were described by S. H. Yu in Adv. Mater 16 (2004), pp. 1636-1640. H. S. Qian et al., in Chem. Mater 18 (2006), pp. 2102-2108 reported the synthesis of Te@carbon-rich composite nanocables and carbonaceous nanofibers by the hydrothermal carbonization of glucose. Moreover, M. M. Titirici et al., in New J. Chem., 31 (2007), pp. 787-789 described the catalyzed HTC as an attractive alternative for the sequestration of carbon from biomass to treat the $CO_2$ problem.

Owing to the high local availability, the low costs and the fact that it is a carbon dioxide neutral material, hydrothermal coal or coal-like materials are a most attractive energy and carbon resource.

There are some reports in the literature, whereby biomass has been used as a source of synthetic building units for preparing e.g. resins.

For instance, U.S. Pat. No. 4,098,765, U.S. Pat. No. 4,201,699, U.S. Pat. No. 4,201,851, U.S. Pat. No. 4,200,723 and U.S. Pat. No. 4,201,700 relate to certain resins which have been obtained using extracts of certain type of biomass such as pecan nut shell extract.

FR-A-2 556 344 relates to a method of the production of a mixture of furfural and hydroxymethylfurfural, which comprises the hydrolysis of lignocellulosic material in an acidic medium in the presence of one or more ketones as solvents. The patent application further describes the hydrogenation of the furfural and hydroxymethylfurfural to give furfuryl alcohol and bishydroxymethylfuran. The mixture of furfural and hydroxymethylfurfural, the mixture of furfuryl alcohol and bishydroxymethylfuran or both mixtures so obtained can be utilized to prepare resins such as furan resins, e.g. resol-type furan resins, or, together with phenol, to prepare phenolic novolac-type resins.

According to the English abstract, CN 1737029 relates to a plant shell biomass-phenol-formaldehyde resin and its preparation. The resin is prepared by pulverizing plant shell biomass, adding an activity protecting agent (such as melamine, polyvinyl), heat treating at normal pressure, adding water, nucleophilic reagent (such as NaOH, phenol or melamine), basic or acidic catalyst, heat treating at normal pressure, and adding phenol or resorcinol and formaldehyde for polymerization to obtain the final product. It is the purpose of this patent application to retain the texture of the plant shell biomass. This is accomplished by using reaction temperatures as low as typically about 100° C. Hydrothermal coal is not, and cannot be obtained. The reaction conditions used are such that the surface of the starting biomass powder is activated but are insufficient to achieve a coalification of the bulk of the material.

The post-functionalization of carbon materials is also known.

WO 01/59008, for instance, relates to asphalt products comprising a bio-binder and a petroleum asphalt. The biobinder is a liquefied bio-binder prepared from biomass material by direct liquefaction or fast pyrolysis of the biomass material. Prior to blending with a petroleum asphalt to give the asphalt product, the liquefied bio-binder may be blended with a coupling polymer, e.g. unsaturated fatty acids, such as safflower oil.

S. Deng and Y. P. Ting in Langmuir 21 (2005), pp. 5940-5948 describe the modification of fungal biomass by graft polymerization of acrylic acid on the surface of the ozone-pretreated biomass.

The modification of ordered hydrothermal carbons by chloroamination with 3-chloropropylamine was studied by M.-M. Titirici et al. in J. Mater. Chem. 17 (2007) pp. 3412-3418. The ordered hydrothermal carbon materials were synthesized using SBA-15 as a starting material. The pores of the as-synthesized SBA-15 template were completely or partially filled with aqueous solution of furfural. Then, the resulting furfural/SBA-15 wet sands were placed in glass vials mounted inside stainless steel autoclaves, which were heated in an oven at 180° C. for 24 h. The resulting products were filtered, washed and dried, and the silica was removed from the composites using aqueous solution of ammonium hydrogen difluoride. The obtained materials were then subjected to chloroamination.

WO 2007/104798 relates to polysaccharide-derived carbonaceous materials called "Starbons". The Starbons are produced from polysaccharides, in particular starch, by carbonization, e.g. in the presence of a catalyst such as an acid catalyst. The as-synthesized Starbons can be post-treated with sulfuric acid so as to form sulfuric acid functions on the surface thereof. Furthermore, a cyano group containing moiety may be grafted to the Starbon and subsequently hydrolyzed to give a carboxylic acid functionalized carbon.

The above references suggest the post-functionalization of as-synthesized carbonaceous material. They are not concerned with the preparation of hydrothermal coal-like material from biomass.

U.S. Pat. No. 5,194,069 deals with the preparation of carbon powders from finely divided base material of organic origin. After pre-drying, the base material is heated to a temperature of 800 to 900° C. to decompose the same by carbonization into carbon powder and reaction fluids. Then, the carbon powder is cooled. According to a preferred embodiment, the cooling step further includes additional treatment of the obtained carbon powder such as mixing with organic and/or inorganic materials. For instance, the carbon powder may be mixed with sawdust, spices, water and, optionally, fat. By way of simple mixing, the mentioned materials cannot be incorporated in the carbon structure, as such.

As can be seen from the above, according to the literature; any modification of the conventional process of preparing hydrothermal coal-like material by incorporating a further copolymerizable compound in the structure so as to obtain hydrothermal hybrid material has not yet been attempted.

There was a strong demand to provide hydrothermal, in particular coal-like, materials, the properties and the preparation process of which can be adjusted easily.

SUMMARY OF THE INVENTION

It has been surprisingly found by the present inventors that the above objects can be achieved by a process for the preparation of hydrothermal hybrid material from biomass comprising the step of heating a reaction mixture comprising water, biomass and a copolymerizable compound to obtain a mixture comprising hydrothermal hybrid material, characterized in that the copolymerizable compound is added when preparing the reaction mixture. This preparation process is occasionally referred to as the general preparation process, hereinafter.

In a variant of the invention, the preparation process comprises the following steps:
  (i) heating a reaction mixture comprising water and biomass to convert the biomass to activated biomass; and
  (ii) adding a polymerization initiator to the reaction mixture obtained in step (i) to copolymerize the activated biomass and a copolymerizable compound that is also present to obtain a mixture comprising hydrothermal hybrid material.

While the above preparation process may comprise steps in addition to the above, it will nevertheless be occasionally denoted as the "two-step (preparation) process", hereinafter.

In the two-step process, the copolymerizable compound can be added when preparing the reaction mixture to be subjected to step (i) and/or it can be added to the reaction mixture in step (ii).

The present invention also relates to hydrothermal hybrid material obtainable by the above processes, in particular in the form of an aqueous dispersion thereof, as such.

Still further, the present invention relates to the use of a copolymerizable compound for the functionalization of hydrothermal materials.

Preferred embodiments are subject of the dependent claims.

The present inventors have unexpectedly found that the deliberate addition of a copolymerizable compound to the starting reaction mixture to be incorporated in the hydrothermal material so as to form a hybrid material allows for adjustment of the physical properties of the obtained materials. For instance, the hydrophilic or hydrophobic properties, the ion binding ability, the glass transition point, the particle size, the degree of condensation, the surface chemistry, the dispersibility, and the carbon contents of the hydrothermal material can be adjusted. Moreover, it was found that the hydrothermal carbonization process as such can be improved by the presence of certain copolymerizable compounds in the reaction mixture. For instance, improvements in terms of yield, reaction rate and heat liberation can be achieved.

BRIEF DESCRIPTION OF THE DRAWINGS

FIG. 2 shows SEM (scanning electron microscopy) micrographs of the aqueous dispersions of coal-like hybrid materials as obtained in Example 7 (FIG. 2a for Example 7a, and FIG. 2b for Example 7b).

DETAILED DESCRIPTION OF THE INVENTION

The general process for the preparation of hydrothermal hybrid material according to the present invention can be referred to as a hydrothermal process, in particular as a hydrothermal carbonisation process. This terminology is intended to show that the process involves the heating of a reaction mixture comprising water and will yield carbonized hydrothermal (hybrid) material.

To prepare the reaction mixture, the copolymerizable compound(s) and the biomass are brought together. There are no specific limitations as to the order of adding the components constituting the reaction mixture, as long as at least one copolymerizable compound is added, i.e. added separately (optionally together with further components of the reaction mixture), when preparing the reaction mixture. For instance, the reaction mixture can be formed by adding copolymerizable compound to the biomass, and, subsequently, the further components of the reaction mixture are added. The copolymerizable compound can likewise be added to a mixture comprising the biomass and all components of the reaction mixture other than the copolymerizable compound to be added. As meant herein, the copolymerizable compound is also added when preparing the reaction mixture of the invention when the copolymerizable compound is added separately (optionally together with further components of the reaction mixture) to the empty reaction vessel, and then the further components of the reaction mixture are charged.

The term "biomass" as used herein is broadly understood as encompassing all kinds of plant and animal material and material derived from the same. According to a preferred embodiment, biomass as meant in the present specification shall not include petroleum or petroleum derived compounds. Furthermore, the biomass for use in the process of the present invention is preferably different from coal or coal-like materials.

The biomass for use in the present invention may comprise macromolecular compounds, examples of which are lignin and polysaccharides, such as starch, cellulose, and glycogen. As used herein, the term "cellulose" is intended to encompass hemicelluloses commonly also referred to as polyoses.

As will be appreciated, certain kinds of biomass may include both, plant and animal-derived material. As examples, manure (dung), night soil and sewage sludge can be mentioned. While the biomass for use in the present invention is preferably plant biomass, i.e. biomass of or derived from plants, certain contents of animal biomass (i.e. biomass of or derived from animals) may be present therein. For instance, the biomass may contain up to 30% of animal biomass.

According to a preferred embodiment, the biomass for use in the present invention is plant biomass, more preferably biomass containing more than 70 wt %, most preferably >90 wt %, of polysaccharides and lignines in terms of the solid contents of the biomass.

For instance, the plant biomass may be agricultural plant material (e.g. agricultural wastes) or all kinds of wood material.

Without limitation, examples of biomass are crop, agricultural food and waste, feed crop residues, wood (such as wood flour, wood waste, scrap wood, sawdust, chips and discards), straw (including rice straw), grass, leaves, chaff, and bagasse. Furthermore, industrial and municipal wastes, including waste paper can be exemplified.

The term "biomass" as used herein preferably also includes monosaccharides such as glucose, ribose, xylose, arabinose, mannose, galactose, fructose, sorbose, fucose and rhamnose, as well as oligosaccharides.

Specific types of biomass contain besides cellulose and lignines, small amounts of compounds, examples of which are terpenes, oils and waxes (present in pine needles), amines and polyphenols (present in oak leaves), and flavones and limonenes (present in orange peels). While these compounds can be incorporated in the structure of the hydrothermal material, it was unknown prior to the present invention that the physical properties of the materials can be adjusted by deliberate addition of such compounds. This is because the contents of the above compounds in raw biomass strongly vary depending on the type and source of raw biomass to be subjected to the conventional hydrothermal carbonization. Due to that fluctuation of the contents of these compounds, the adjustment of the physical properties of the hydrothermal materials achieved in the present invention by deliberate addition of copolymerizable compound(s) was impossible in the conventional hydrothermal carbonization methods using only raw biomass as starting material.

Accordingly, the present invention is in one aspect directed to the use of copolymerizable compounds for the functionalization of hydrothermal materials. In this specification, the expression "hydrothermal materials" will be used for materials generated by a hydrothermal process, in particular a hydrothermal carbonization process. In the broadest aspect, the notion "functionalization" of a material means that the material is provided with functionality, in particular chemical functionality, such as acidic, basic, coordination. More specifically, as meant herein, "functionalization" refers to the adjustment or fine-tuning of properties of the hydrothermal material, especially physical or chemical properties such as for instance, the hydrophilic or hydrophobic properties, the ion binding ability, the glass transition point, the particle size, the degree of condensation, the surface chemistry, the dispersibility, and the carbon contents of the hydrothermal material.

According to another aspect, the present invention relates to the use of copolymerizable compounds for improving the hydrothermal carbonization process, in particular for enhancing the yield, reaction rate and heat liberation during the process.

The biomass for use in the present invention is preferably raw biomass or raw biomass which has been further subjected to fermentation (also referred to as "fermented biomass"). As used herein "raw" biomass is intended to mean that the biomass for use in the process of the invention is native biomass, which may have been subjected to physical treatments such as mixing or comminution steps, for instance grinding, chopping or sawing.

Raw biomass may for instance be the biomass obtained as waste (e.g. wood, agricultural, municipal waste) from the provider without further treatment, or as collected from natural sources. In the case of wood, the raw wood biomass may be the wood collected in the forest (as the natural source), or sawdust from the wood processing industry. As meant herein, the fermentation of raw biomass refers to any conversion of the raw biomass caused by microorganisms under aerobic or anaerobic conditions. One example of fermented biomass is brewery waste.

The biomass can be used in the present invention in any form. Preferably, however it is divided into an appropriate particle size prior to use, e.g. in the range of 0.1 to 20 mm, more preferably 0.3 to 10 mm, especially 0.5 to 5 mm. Especially in the case of raw biomass, such comminution is done with particular benefit to enhance the reactivity of the starting biomass. Suitable particle sizes such as those exemplified above can be obtained by methods such as grinding, chopping or sawing.

As used herein, the term "copolymerizable compound" can mean both, a single copolymerizable compound, or a mixture of more than one kinds of copolymerizable compounds. It has been explained above that in forming the reaction mixture to be heated, the copolymerizable compound is deliberately added, for instance as an entity different from the biomass, i.e. the raw and/or fermented biomass. As mentioned above, biomass, i.e. raw biomass or fermented biomass, may contain certain amounts of compounds which are capable of being incorporated in the structure of the hydrothermal material during the process of the invention. Consequently, the biomass for use in the present invention may already comprise certain amounts of the copolymerizable compound to be added in the process of the invention. Even in this case, however, the copolymerizable compound and the biomass are different species in that the latter comprises various compounds in addition to the copolymerizable compound. This being said, the copolymerizable compound and the biomass for use in the present invention are different, i.e. different chemical species, and this is implied by the different terms "biomass" and "copolymerizable compound". Accordingly, the copolymerizable compound is preferably not added in the form of biomass in the preparation process according to the present invention. According to a particularly preferred embodiment of the present invention, the copolymerizable compound is not lignin sulfonic acid or lignin sulfate.

The copolymerizable compound for use in the present invention is not specifically limited in terms of structure, as long as this can react with the biomass or the activated biomass (i.e. the degradation products of biomass formed upon heating the reaction mixture) so as to be incorporated in the structure of the hydrothermal material to form a hybrid material. The capability of being incorporated in the structure of the hybrid material is reflected by the term "copolymerizable" in relation to the compound. The above incorporation of the copolymerizable compound in the structure of the hybrid material preferably occurs by means of chemical bonding, in particular covalent bonding.

For the incorporation in the hybrid material, the copolymerizable compound for use in the present invention may comprise a binding moiety capable of reacting with the bio- mass or degradation products thereof so as to be bound within the structure of the hydrothermal hybrid material.

The binding moiety of the copolymerizable compound may be without limitation an amino group, a carbonyl group, a phenolic hydroxyl group and/or a carbon-carbon double bond. The amino group may be a primary or, secondary amino group, and for reasons of reactivity with the (activated) biomass it is preferably a primary amino group. The carbonyl group may be a keto or an aldehyde group. As used herein, the term "phenolic" in relation to a hydroxyl group is intended to mean that the hydroxy group is directly linked to an aromatic nucleus. The carbon-carbon double bond is preferably a terminal double bond, and it is most preferably an activated vinyl group.

Dependent on the type of binding moiety, the copolymerizable compound can be incorporated in the structure of the hydrothermal hybrid material by different reactions. When the binding moiety is an amino group, the bonding to the structure of the hydrothermal hybrid material can occur by way of the Maillard reaction. Carbon-carbon double bonds can be linked to the structure of the hybrid material upon the formation thereof via cycloaddition and also, though subordinately, via radical processes. Copolymerizable compounds having, as a binding moiety, a carbonyl group, i.e. aldehydes and ketones, can react via aldol condensation. Finally, phenolic hydroxyl groups can undergo alkylation with activated hydroxymethyl groups present in activated biomass (e.g. in hydroxymethylfurfural) so as to be incorporated in the hydrothermal material.

In addition to the at least one binding moiety, the copolymerizable compound may further comprise at least one functional moiety. While the binding moiety will react during the formation of the hydrothermal hybrid material so as to be incorporated in, i.e. bound to, the structure thereof, the functional moiety of the copolymerizable compound will typically not react with the activated biomass under these conditions. Without limitation, the functional moiety may be selected from the group consisting of carboxyl, anhydride, phosphonate, sulfonic acid, sulfonate, imide, cyano, hydroxyl, guanidino, heterocyclic groups, $C_{8-24}$ alkyl and $C_{8-24}$ alkylene groups, aromatic groups and (oligo)(ethyleneoxy) groups. As implied by the name, the functional moiety can impart certain functions or properties to the resultant hydrothermal hybrid material.

For instance, copolymerizable compounds carrying, as the functional moiety, carboxyl, anhydride, phosphonate or sulfonate groups can impart to the hydrothermal hybrid material acidic, hydrophilic and/or anionic properties. According to a preferred embodiment, these types of functional moieties are present in copolymerizable compounds along with—preferably terminal—carbon-carbon double bonds. Examples of copolymerizable compounds wherein the binding moiety is a carbon-carbon double bond and the functional moiety is a carboxyl group are acrylic acid and methacrylic acid, collectively referred to as (meth)acrylic acid in this specification. Maleic anhydride is an example of a copolymerizable compound having a carbon-carbon double bond as a binding moiety, and an anhydride group as a functional moiety. Vinyl phosphonates, e.g. of the following formula:

wherein M represents for example sodium or potassium, are examples of a copolymerizable compound rendering the resultant hydrothermal hybrid material hydrophilic and anionic, the binding moiety in the copolymerizable compound being a carbon-carbon double bond, and the functional moiety being a phosphonate group. Acrylamidoalkyl sulfonic acids and salts thereof, such as acrylamidopropyl sulfonate, are examples of copolymerizable compounds comprising, as a binding moiety, a carbon-carbon double bond, and, as a functional moiety, a sulfonic acid or sulfonate group.

Another type of copolymerizable compounds capable of imparting acidic, hydrophilic and/or anionic properties to the resultant hydrothermal hybrid material are those comprising, as a binding moiety, a (primary) amino group, and, as a functional moiety, a carboxyl group. Examples of this type of copolymerizable compounds are amino acids, such as glycine and taurine.

Copolymerizable compounds rendering the resultant hydrothermal hybrid material hydrophilic, acidic and anionic, such as in particular (meth)acrylic acid, maleic anhydride, acrylamidopropyl sulfonate, vinyl phosphonates, glycine and taurine are useful to improve the ion binding ability of the hybrid materials. Therefore, such hydrothermal hybrid materials, in particular hydrothermal coal-like hybrid materials, can be used with benefit as a soil conditioner, and in water treatment.

Maleic imide and derivatives thereof represent copolymerizable compounds comprising, as a binding moiety, a carbon-carbon double bond. By suitable derivatization of the maleic imides, desired functional properties can be imparted to the resultant hybrid material. Maleic imide derivatives can be obtained by reacting maleic anhydride with amine compounds (preferably in stoichiometric amounts). There are no specific limitations as to the amine compound that can be reacted with maleic anhydride to give a maleic imide derivative, which can be used as a copolymerizable compound in the present invention. Examples of suitable amine compounds are amino containing polymers for steric stabilization. For instance, the Jeffamine® series polyether amines, such as Jeffamine D2000® can be used. By using amino containing polymers such as Jeffamine® polyether amines, very fine particles of hydrothermal hybrid material, in particular coal-like hybrid material can be obtained.

A still further class of copolymerizable compounds are those rendering the resultant hydrothermal hybrid materials hydrophilic and cationic. Suitable copolymerizable compounds belonging to this class comprise basic moieties, such as certain heterocyclic groups, in particular heterocyclic groups containing one or more nitrogen atoms, such as imidazol or pyridine. Specific individual examples of copolymerizable compounds comprising imidazole or pyridine heterocyclic groups are histidine, vinyl imidazole and vinyl pyridine. Another functional moiety suitable to impart basic properties, in particular carbon dioxide absorbing properties, is the guanidino group. Hydrothermal hybrid material obtainable by using this class of copolymerizable compounds are useful as cationic formulation aids and flocculating agents, e.g. for the flocculation of anionic sols. Using arginine or histidine as copolymerizable compounds proved to give highly effective flocculation agents. Moreover, hydrothermal hybrid material obtainable by using this class of copolymerizable compounds, in particular arginine, turned out to be excellently suited as reversible carbon dioxide binding agents. Consequently, hydrothermal hybrid material according to the invention obtainable from a reaction mixture comprising copolymerizable compound(s) having cationic functional moieties, in particular guanidino groups such as arginine proved to be highly suitable for carbon capture and storage (CCS) schemes, in particular of large scale, which is considered to be an approach to mitigate global warming. Cationic peptide fragments or protein concentrates, for instance those obtained from the by-products of industrial biotechnology are further examples of copolymerizable compounds rendering the resultant hydrothermal hybrid materials hydrophilic and cationic.

Another class of copolymerizable compounds for use in the present invention are those comprising non-ionic hydrophilic groups such as hydroxyl groups, oligoethyleneglycols or acid amides. Copolymerizable compounds comprising, as a binding moiety, an amino group, and as a functional moiety, a hydroxyl group can be exemplified. Concrete examples are alkanol amines and dialkanol amines, e.g. ethanol amine and diethanol amine. When incorporated into the hydrothermal material, this class of copolymerizable compounds is capable of increasing the compatibility with other materials such as rubber or synthetic resins. For these reasons, this type of hydrothermal hybrid materials is excellently suited as filler. At the same time, the primary particle size of the dispersions can be reduced.

A still further class of copolymerizable compounds for use in the present invention are phenols. "Phenols" as this term is used herein, refer to aromatic hydroxy compounds comprising one or more, preferably one or two hydroxyl groups directly attached to the aromatic nucleus. A typical example is phenol, i.e. hydroxy benzene. This class of copolymerizable compounds was found to accelerate the network formation of the hybrid material in relation to hydrothermal (coal-like) materials obtained without adding any phenol. Due to the presence of the aromatic groups in the structure, these hydrothermal materials are quite hydrophobic and can be easily dispersed in apolar organic solvents, such as toluene or mineral oil. In addition, these hybrid materials are highly compatible with synthetic resins such as phenol-formaldehyde-resins and as such can be suitably used as fillers.

Copolymerizable compounds comprising cyano groups as a functional moiety can be incorporated in the hydrothermal material to increase the relative nitrogen contents while reducing the relative oxygen contents. Typical examples of such copolymerizable compounds are acrylonitrile and dicyanamide and salts thereof. Owing to the presence of cyano groups in the final hydrothermal hybrid material, they are highly compatible with synthetic resins, such as phenol-formaldehyde resins and as such can be used as fillers with particular benefit.

Copolymerizable compounds comprising long-chain alkyl or alkylene groups in addition to the binding moiety can be used to impart hydrophobic properties to, and to enhance the plasticity of the hybrid material. Examples of corresponding copolymerizable compounds are unsaturated fatty acids and fats, long-chain (e.g. $C_{8-24}$) aldehydes and ketones, and long-chain (e.g. $C_{8-24}$) amines. Safflower oil, rapeseed oil, fish oil (e.g. obtainable from fishing waste) and line seed oil are examples of suitable fats. The incorporation of higher amounts of this type of copolymerizable compounds in the structure may lead to an asphalt-like material and the incorporation of copolymerizable compound in an amount as high as about 20 wt % in relation to the biomass may result in a complete liquefaction of the biomass.

The incorporation of copolymerizable compounds carrying, as functional moieties, surfactant residues can afford hydrothermal hybrid material, in particular coal-like material in finely disperse form. The surfactant residues may carry ionic charges, i.e. they may be anionic or cationic surfactant residues. Also, the surfactant residues may be non-ionic surfactant residues, e.g. comprising water-soluble domains having a molecular weight of >1500, preferably in the range of 2000 to 3000, which will be suitable for steric stabilization, e.g. in water. The dispersions of these kinds of hydrothermal hybrid material in water are highly stable and are not prone to sedimentation.

Copolymerizable compounds having non-ionic groups such as hydroxyl groups, in addition to the binding moiety were shown to give hydrothermal hybrid material forming dispersions, in particular aqueous dispersions, having excellent stability. Examples are alkanol amines and dialkanol amines, collectively referred to as (di)alkanol amines in the present specification. Further examples are (di)(oligoethylene glycol) amines, in particular those comprising 1 to 5 ethyleneglycol moieties in the chains attached to the amine group. These compounds can be represented by the formula $H_2N(C_2H_4O)_xH$ and $H(OH_4C_2)_xNH(C_2H_4O)_yH$, wherein x and y are independently an integer of from 1 to 5. (Di)ethanol amines are used with preference. Furthermore, acrylamidoalkyl sulfonic acids and salts thereof, i.e. compounds having anionic groups (or residues) can be cited here. The acrylaminoalkyl sulfonic acid and salts thereof may for instance be acrylamido-$C_{2-5}$-alkyl sulfonic acid and salts thereof. Acrylamidopropyl sulfonic acid (AMPS) and salts thereof proved to be particularly advantageous. Another example of copolymerizable compounds affording, when incorporated in the hydrothermal hybrid material, highly stable dispersions is acrylonitrile. Without being bound to theory, this is assumed to be due to chemical interference with the coalification process leaving a high amount of polar groups onto the particles of the hydrothermal hybrid material. Hydrothermal, in particular coal-like, hybrid material having incorporated in its structure the above kind of copolymerizable compounds can be obtained by way of the general and the two-step preparation process of the invention in the form of an aqueous dispersion having excellent stability. The present invention is also concerned with these aqueous dispersions as such. The amount of the hydrothermal hybrid material according to the invention in the aqueous dispersions may be in the range of 5 to 75 wt %, typically it is in the range of 10 to 50 wt %, in terms of the weight of the aqueous dispersion.

The particle size of this type of hydrothermal (coal-like) hybrid materials, e.g. in aqueous dispersions, is typically in the range of micrometers, i.e. 1 to 20, preferably 1 to 10, more preferably 1 to 5 μm.

The present inventors found that the uniform particle size of this type of hydrothermal (coal-like) hybrid material can be further reduced to the nanometer range by using combinations of copolymerizable compounds carrying, as functional moieties, surfactant residues. In this case, the uniform particle size can be reduced to e.g. 10 to 100 nm, preferably 15 to 80 nm, more preferably 20 to 40 nm. For instance, combinations of acrylamidopropyl sulfonic acid (AMPS) and ethanol amine, for instance 1 wt % AMPS and 2 wt % ethanol amine (in relation to the solid contents of the biomass in the reaction mixture) was shown to give nanoparticulate hydrothermal (coal-like) hybrid material, e.g. of a particle size of as low as 20 to 40 nm.

The above fine particulate dispersions (having a uniform particle size in the micrometer or nanometer range), in particular the aqueous dispersions, are highly useful in the field of toners, e.g. for electrophotography, and in the field of black pigments, e.g. for colouring and printing purpose. For instance, the above dispersions can be used as precursors of toners, which after having been subjected to conventional processes of toner manufacturing, including the optional addition of general further ingredients and additives of toners will afford highly useful toners.

Summarizing the above, the copolymerizable compound for use in the present invention is preferably selected from the group consisting of vinyl group-containing carboxylic acids, such as (meth)acrylic acid, maleic anhydride, maleic imide derivatives, acrylamidoalkyl sulfonic acids and salts thereof, vinylphosphonates, amino acids, such as glycine, taurine, histidine and arginine, phenols, acrylonitrile, dicyanamide and salts thereof, peptides, in particular cationic peptides, vinylimidazole, vinylpyridine, (di)alkanolamines, unsaturated fatty acids and fats, aldehydes, in particular $C_{8-24}$ aldehydes, ketones, in particular $C_{8-24}$ ketones, amines, in particular $C_{8-24}$ amines, and (di)(oligoethyleneglycol) amines, in particular those comprising 1 to 5 ethylene glycol moieties.

In view of the above, the present invention also relates to the use of at least one copolymerizable compound to impart to hydrothermal, preferably coal-like, material properties such as those selected from acidic/basic, hydrophobic/hydrophilic and anionic/cationic properties.

According to a preferred embodiment, the copolymerizable compound for use in the present invention is a chemical, for instance an industrial chemical or a fine chemical. According to a more preferred embodiment, the above chemical is a commercially available chemical.

The copolymeriazble compound, when it is a chemical, may be, without limitation, a petrochemical compound, a product of coal chemistry, or a product obtained by industrial biotechnology (often referred to as "white" biotechnology). As meant herein, a product of coal chemistry means a chemical that is produced from coal as a starting material. Without limitation, the corresponding chemical for use as a copolymerizable compound in the invention can be isolated from coal, directly, or be obtained from coal by a process involving a certain number of conversion steps, such as for instance between 1 to 8, more preferably 1 to 4 chemical conversion steps. As used herein, the "industrial biotechnology" is intended to refer to industrial chemical processes using organisms or parts thereof, such as enzymes, cells or microorganisms to obtain the products.

According to one embodiment, which is a preferred embodiment, the copolymerizable compound is a petrochemical compound. "Petrochemical compound" as used herein means a compound that is obtained from petroleum or natural gas. That means it is a compound that can be either be isolated from petroleum or natural gas (e.g. by distillation), directly, or which involves at least one chemical conversion step starting from petroleum. According to a preferred embodiment, the petrochemical compound is either isolated from petroleum or natural gas, directly, or is obtained from petroleum or natural gas by a process involving between 1 to 8 chemical conversion steps, more preferably 1 to 4 conversion steps.

The petrochemical copolymerizable compound of the invention may be, without limitation, selected from the group, consisting of vinyl group-containing carboxylic acids, such as (meth)acrylic acid, maleic anhydride, maleic imide derivatives, acrylamidoalkyl sulfonic acid and salts thereof, vinylphosphonate, phenols, acrylonitrile, dicyanamide and salts thereof, vinylimidazole, vinylpyridine, alkanolamine, dialkanolamine, unsaturated fatty acids and fats, $C_{8-24}$ aldehydes, $C_{8-24}$ ketones and $C_{8-24}$ amines, and $H_2N(C_2H_4O)_xH$, $H(OH_4C_2)_xNH(C_2H_4O)_yH$ (with x and y being independently an integer of from 1 to 5).

Especially in cases, in which the copolymerizable compound is a chemical, which is a petrochemical compound or a product of coal chemistry, more preferably a petrochemical compound, most preferably a petrochemical compound selected from those listed above, the present invention is also directed to the hydrothermal, preferably coal-like, hybrid material of the invention as such, which is obtainable by the preparation process of the invention (either the general or the two-step preparation process) followed by the further step of separating the hybrid material from the resultant mixture.

According to a preferred embodiment of the present invention, the biomass is raw biomass or fermented biomass, and the copolymerizable compound is a petrochemical compound or a product of coal chemistry as defined above. According to a more preferred embodiment, the biomass is raw biomass or fermented biomass, and the copolymerizable compound is a petrochemical compound as defined above, most preferably a petrochemical compound which is commercially available, such as those exemplified above.

Owing to the hydrothermal preparation method, the material of the present invention, i.e. the product of the preparation process, is referred to as a "hydrothermal" hybrid material. It is a product, more precisely a carbonized product that is obtained or obtainable by the hydrothermal carbonization process of the invention. During the hydrothermal preparation process of the invention, the texture of the raw biomass will typically get lost. Preferably, the hydrothermal material of the invention is coal-like hybrid material. The attribute "coal-like" is intended to indicate that the material is similar to natural coal in terms of property and texture. For instance, it may be possible to pulverize the coal-like material by hand. Accordingly, the term "coal-like" as used herein to characterize the hybrid material can also be replaced by "carbonaceous". When coal-like or carbonaceous hybrid material is obtained in the preparation process of the invention, the polymerization which takes place during the hydrothermal carbonization can also be referred to as a coalification.

The (preferably coal-like or carbonaceous) material of the invention is a hybrid material. The term "hybrid material" as used herein is intended to mean a hybrid material comprising, preferably consisting of, biomass (more precisely the activated biomass formed upon heating the reaction mixture), and the copolymerizable compound(s). That means, the at least one copolymerizable compound (as defined above) is incorporated in the carbonaceous structure or network of the material. As such, the hybrid material of the present invention is different from a physical mixture or blend of carbonized material obtained from the biomass, and copolymerizable compounds. The copolymerizable compound may be incorporated in the structure or network of the hydrothermal hybrid material of the present invention by forming chemical, such as covalent bonds. Owing to the preparation method, the copolymerizable compound(s) can be evenly distributed within the structure or network of the hybrid material. In particular, it is not merely located at the surface of the material. This is different from post-functionalization methods, such as described e.g. for ordered mesoporous carbons by M.-M. Titirici in J. Mater. Chem. 17 (2007, pp. 3412-3418).

Also, the hydrothermal hybrid material can be distinguished from synthetic resins, including those synthetic resins, which have been prepared using monomers isolated from lignocellulosic material, such as resol-type furan resins and phenolic resins, e.g. novolac-type phenolic resins. The above kinds of synthetic resins are preferably not encompassed by the expression "hydrothermal hybrid material" as used herein.

The proportion by weight of the parts in the hydrothermal hybrid material derived from copolymerizable compound(s), in terms of the solid contents of the hydrothermal, preferably coal-like, hybrid material is not specifically limited as long as the formation of the structure of the hybrid material is not inhibited. For instance, the proportion of the part derived from the copolymerizable compound(s) may be in the range of 0.5 to 25 wt %, preferably it is 1 to 20 wt % and more preferably 2 to 10 wt %, all in terms of the total solids content of the hydrothermal hybrid material.

Owing to their distinct properties, the hydrothermal, preferably coal-like, hybrid materials of the invention are without limitation useful as soil conditioners, in water treatment, as formulation aids, as flocculating agents, as reversible carbon dioxide binding agents, in carbon capture and storage (CCS) schemes, and as fillers.

Without wishing to be bound by theory, it is assumed that the biomass is converted upon heating to activated biomass (e.g. "biomass monomers"), which will subsequently undergo under the hydrothermal reaction conditions a copolymerization reaction with the copolymerizable compound(s) to form hydrothermal hybrid material.

The mechanism of the conversion of the biomass to activated biomass (referred to as "activation") can be assumed to be as follows. Upon heating, the macromolecular species, e.g. the polysaccharides contained in or constituting the biomass may be molten or dissolved in water. For instance, cellulose contained in the biomass, which is a crystalline material, will be molten in water. Moreover, the polysaccharides can be disintegrated or broken down to smaller fragments, such as monosaccharides and oligosaccharides. Those fragments will undergo consecutive rapid dehydration to more reactive intermediates. These intermediates are capable of reacting with other biomass-derived reactive intermediates and/or the copolymerizable compound(s) to give hydrothermal hybrid material, in particular hydrothermal coal-like hybrid material. Due to this capability, the reactive intermediates can also be referred to as "biomass monomers". The dehydration of glucose to hydroxymethylfurfural is an example of such a dehydration reaction. In comparison to the raw biomass, these "biomass monomers" are typically characterized by increased chemical reactivity towards intermolecular reactions both with other biomass monomers and with copolymerizable compounds, e.g. via vinylic subunits, reactive aldehyde side groups, or activated hydroxymethyl groups linked to furane moieties.

The activated biomass produced in the reaction mixture during heating comprises the products of the disintegration and/or dehydration of the starting "raw" biomass as detailed above, collectively referred to as "activated biomass" in the present specification.

The activated biomass will subsequently undergo copolymerization with other molecules of the activated biomass and/or the copolymerizable compound(s) present in the reaction mixture. This results in the built-up of larger molecules, in particular molecules comprising, both, parts derived from the biomass and copolymerizable compounds. The copolymerization may include chain-growth of the activated biomass, in particular of biomass monomers, reaction with the copolymerizable compound (e.g. via the binding moiety thereof), and inter-chain crosslinking.

The water being present in the reaction mixture may be water adhering or bound to the original biomass, which can also be referred to as "raw" biomass as defined above. The water content of raw biomass may for instance be up to 80 wt %. As will be appreciated from the above, the raw biomass can be used as such and with water contents as mentioned above. Though drying is not excluded, e.g. in order to reduce the weight and consequently the transportation costs, the (raw) biomass to be subjected to the process of the invention is preferably not dried. Consequently, the present invention allows avoiding the energy-consuming drying of the biomass.

The presence of water in the process of the invention distinguishes this from e.g. pyrolytic processes for the conversion of biomass to carbonaceous (e.g. coal-like) materials by simple heating, typically in the absence of oxygen.

In addition to the water present in, e.g. bound to the raw biomass such as obtained from natural sources, water may be added to the wet or dry biomass to adjust the water content in the reaction mixture. The total amount of water, i.e. the water bound to or contained in the raw biomass and the additional water is not specifically limited. Preferably, the weight ratio of water to biomass (water/biomass) in the reaction mixture is in the range of 0.3 to 10.

The hydrothermal carbonisation process of the present invention can be carried out in water alone. Organic solvents such as ketones are unnecessary, and they are preferably omitted. According to a preferred embodiment, the reaction mixture contains water as a single solvent, with other solvents such as ethanol only incidentally brought in by the biomass, e.g. by fermentation. Consequently, preferably at least 95 wt %, more preferably at least 98 wt % of the solvent present in the reaction mixture of the first step is water.

The reaction mixture comprising water, biomass and copolymerizable compound to be subjected to heating may comprise, without limitation, further ingredients as long as these do not inhibit the formation of the hydrothermal hybrid material.

The present inventors found that an acidic pH of the reaction mixture is advantageous. The pH is preferably in the range of 3 to 7, such as 4 to 6 or 5 to 7. By adjusting the pH to the acidic range, the disintegration, in particular of polymeric compounds in the biomass, e.g. by hydrolysis can be accelerated, and the yield of activated biomass, e.g. smaller fragments can be increased. There are kinds of biomass, which are more difficult to activate than others. Wood is an example of biomass, which is quite difficult to activate. In the case of biomass, which is more difficult to activate, the pH is adjusted to lie within the acidic range with particular benefit.

The desired pH of the reaction mixture can be controlled to lie within the above ranges by adding suitable acids, which do not interfere with the activation of the biomass and the reaction to give hydrothermal hybrid material. The acid is preferably a strong acid, e.g. having a $pK_a$ of less than 4.5. Both, inorganic acids, e.g. mineral acids, and organic acids can be used. An example of a suitable mineral acid is phosphoric acid. Citric acid, lactic acid and pyruvic acid are examples of (strong) organic acids.

The reaction mixture, which may e.g. comprise an acid in addition to the (raw) biomass, water and the copolymerizable compound, can be prepared in a suitable mixer.

Dependent on which type of biomass is used as a starting material, the particular reaction conditions may be selected appropriately. In particular, for biomass which can be activated relatively easily, such as monosaccharides, the heating time may be shorter and the pH less acidic than for polymeric biomass starting material, such as wood and straw.

The heating temperature (or the reaction temperature) in the general preparation process is not particularly limited, as long as it is sufficient to convert at least larger parts of the (raw) biomass subjected to the process to activated biomass as defined herein, and to copolymerize the activated biomass with the copolymerizable compound(s). Preferably, the heating temperature is such that at least 80 wt % of the raw biomass will react. The heating temperature (or the reaction temperature) may be in the range of 170 to 270° C., and it is preferably 180 to 250° C., more preferably 180 to 230° C.

For the purpose of this specification, the reaction temperature is meant to refer to the temperature, more specifically the average temperature, inside the reaction mixture, which can be measured with a thermocouple. Consequently, it is readily possible to control the reaction temperature to lie within the desired range by heating or cooling the reactor, as appropriate.

According to a particularly preferred embodiment of the general preparation process, the temperature is 180 to 230° C., and the pH value of the reaction mixture is acidic, especially 3 to 7.

Without limitation, the reaction (including activation of the biomass and the copolymerization) to give the hydrothermal hybrid material may be finished for instance within 1 to 3 hours. That is, within that time frame, a hydrothermal, preferably coal-like, hybrid material of reproducible quality can be obtained. Of course, the reaction time can be shorter or longer if desired.

The process according to the present invention is preferably carried out in a pressure resistant reactor, e.g. an autoclave or an extruder. Due to the water in the reaction mixture, there will be a pressure increase upon heating. As the hydrothermal carbonization reaction is exothermic, external heating may no longer be necessary, once the reaction has started, provided the thermal insulation of the reactor or reactors is sufficient.

Subsequent to the reaction to give a mixture comprising hydrothermal, preferably coal-like, hybrid material, the solid phase comprised or consisting of the hybrid material can be separated from the reaction mixture, e.g. by filtration or decantation, preferably by filtration, while a liquid phase will remain. Then, the hybrid material can be dried.

In the two-step preparation process, the copolymerizable compound may be added when preparing the reaction mixture to be subjected to step (i). In the alternative or in addition, the copolymerizable compound can be added to the reaction mixture in step (ii).

Where appropriate, the particulars of the general preparation method of the invention as illustrated above will also be applicable to the two-step process. In particular, the definition of the reactants, e.g. of the hydrothermal, preferably coal-like, hybrid material, the biomass and the copolymerizable compounds, and the preferred embodiments thereof are the same. Moreover, the two-step process for the preparation of hybrid material from biomass comprising the steps (i) and (ii) can be referred to as a hydrothermal carbonization process.

In step (ii), the activated biomass is subjected to copolymerization to give hydrothermal hybrid material as defined above. To account for the fact that the "activated biomass" obtained in step (i) will be copolymerized with the copolymerizable in step (ii), the "activated biomass" may in the alternative be referred to as "polymerizable biomass".

In this variant of the preparation process of the invention, the copolymerization is initiated by addition a polymerization initiator to the reaction mixture in step (ii). According to a particularly preferred embodiment, the reaction mixture obtained in step (i) is directly subjected to step (ii), i.e. without any intermediate treatment. However, the reaction mixture obtained in step (i) may be cooled by allowing to stand or by active cooling, prior to adding the polymerization initiator to start step (ii).

The polymerization initiator for use in the present invention is not specifically limited in kind, as long as it is suitable to initiate the copolymerization of the activated biomass with the copolymerizable compound to the hydrothermal hybrid material in the second step of the hydrothermal carbonization process of the present invention. Under the reaction conditions of the second step, the polymerization initiator is usually capable of generating radicals which will start the copolymerization of the activated biomass to hydrothermal, preferably coal-like, hybrid material. According to a preferred embodiment, the polymerization initiator is not added in the form of biomass.

Useful polymerization initiators are for instance azo compounds, peroxides, oxygen and redox initiators, as well as mixtures thereof. The azo compound may be azobisisobutyronitrile. Useful peroxides are inorganic peroxides, e.g. persulfates such as potassium persulfate and ammonium persulfate; metal peroxides such as $(C_2H_5)_2BOOC_2H_5$ and compounds obtained by replacing the boron atom of $(C_2H_5)_2BOOC_2H_5$ with Al or Zn; organic peroxides, e.g., acyl peroxides such as benzoyl peroxide, alkyl peroxides such as t-butyl peroxide and cumyl peroxide, peroxy acid esters such as t-butyl peroxalate, or hydrogen peroxide. As the redox initiator, there may be used hydrogen peroxide-$Fe^{2+}$ (Fenton's reagent), persulfate and sulfite and cumene hydroperoxide-amine-based compounds. In addition, copper salts such as $CuCl_2$ can be used. In the alternative and most preferably, $FeCl_3$ and $H_2O_2$ are used as the redox initiator.

More specifically, polymerization initiators known to be useful for the hardening of unsaturated polyesters are also useful to initiate the copolymerization in the second step.

One specific type of polymerization initiators useful in the present invention is commonly referred to as warm hardeners. Warm hardeners are typically peroxides which will be decomposed at their decomposition temperature to form a radical which will start the polymerization, i.e. carbonization, to yield the target coal-like material. Examples of such peroxides are benzoyl peroxide, cumolhydroperoxide, methylisobutylketonperoxide, and tert.-butylperoxybenzoate. As will be appreciated, the reaction mixture in the second step is preferably heated to or above the decomposition temperature of the peroxide to generate radicals, when warm hardeners are used as polymerization initiators.

The second type of polymerization initiators which are likewise useful in the process of the present invention are often referred to as cold hardeners, e.g. in the field of unsaturated polyesters. Cold hardeners representing suitable polymerization initiators for use in the present invention generally comprise an accelerator compound and a peroxide, the peroxide being added with preference after the accelerator compound. Examples of the accelerator compound are iron salts. Suitable peroxides are e.g. acetylacetone peroxide, methylethylketone peroxide and cyclohexanone peroxide. Further examples of the cold hardeners are amine-based accelerators, such as dimethyl aniline and diethylenaminetetracetate, in combination with benzoyl peroxide. As suggested by the name, cold hardeners do not require any heating to form radicals to start the polymerization in the second step.

In order to avoid any contamination of the product, i.e. the hydrothermal, preferably coal-like, hybrid material obtained in step (ii), the polymerization initiator does preferably not contain any metal. If the initiator contains any metal, the metal content in the hybrid material is adjusted to preferably not more than 0.5 wt %, more preferably not more than 0.1 wt %.

Due to the addition of the polymerization initiator, the reaction temperature can be lower in the second step than in the first step. This allows for carrying out the process in less elaborate equipment, e.g. in a simple autoclave and has also significant benefits in terms of the reproducibility of the process and the quality control of the end product. Furthermore, in comparison to the general preparation process of the invention, the copolymerization, i.e. carbonization to give the final product will proceed much quicker, e.g. by a factor of 3 to 10.

For instance, the reaction temperature in the second step (occasionally denoted $T_2$ in this specification) can be in the range of 140 to 220° C., preferably it is 170 to 210° C., and more preferably 180 to 200° C. According to a particularly preferred embodiment, the temperature in the second step is below the temperature in the first step. For instance, the reaction mixture may be heated to a temperature in the range of 210 to 250° C. in the first step, and to a temperature in the range of 170 to below (i.e. not including) 210° C., especially to 180 to 200° C. in the second step. This is a particularly preferred embodiment. According to another preferred embodiment, the reaction temperature in the first step may be 220 to 250° C., and in the second step to 170 to 210° C.

The two-step preparation process may further comprise the step of separating the mixture obtained in step (ii) into a solid phase of the hydrothermal, preferably coal-like, hybrid material, and a liquid phase. As the present inventors found out, the liquid phase can be reused in the hydrothermal carbonisation process of the invention with particular benefit. For instance, the above liquid phase, which preferably contains >80 wt %, more preferably >90 wt % of water can be oxidized to obtain an oxidized liquid phase. This can be done with any oxidizing agent, as long as this has a suitable oxidation potential to effect the oxidations as outlined hereinafter, and as long as the oxidizing agent or the reaction products thereof does not interfere with the further uses of the (oxidized) liquid phase as detailed below. Examples of useful oxidizing agents are, without limitation, oxygen, hydrogen peroxide, percarbonate, and percarbonic acids. Preferably, the oxidizing agent is an oxygen-containing gas, which is preferably air. In the case of the oxygen-containing gas, such as air, the oxidation of the liquid phase can be effected by bubbling the gas through the liquid phase, stirring the liquid phase in an atmosphere of the gas or by allowing the liquid phase to stand in the presence of the gas.

According to an alternative embodiment, the reaction mixture obtained in the second step which contains the liquid (aqueous) phase, rather than the (separated) liquid phase as such is oxidized, and the oxidized liquid phase is subsequently separated from the solid phase of the hydrothermal hybrid material in the mixture.

The present inventors have discovered that the liquid phase in the mixture obtained in the second step, as a result of the hydrothermal carbonization process, contains e.g. ethers and ketones (such as laevulic acid), which can be converted into the corresponding peroxides through the oxidation. Examples of the peroxides are ketone peroxides, such as hydroxyacetone peroxides. These (hydro)peroxides can be recycled to the second step of the reaction, and be used as a polymerization initiator.

Moreover, it was found out by the present inventors that strong organic acids such as lactic acid or pyruvic acid will be generated during the two-step hydrothermal carbonization process of the present invention. Hence the liquid phase obtained in the second step can also be recycled to the first step, where these acids will be effective in accelerating the activation of the biomass, in particular the disintegration as detailed above. If desired, the liquid phase obtained in the second step can be subjected to oxidation, as explained above, prior to recycling to the first step.

As meant herein, the recycling of the liquid phase to the first step also covers the embodiment where it is recycled to the mixing unit (to be further explained hereinafter) from which it will be transferred to the reactor in which the step (i) is to be carried out.

With an eye on the heat management, the optionally oxidized liquid phase preferably is still hot (e.g. it has a temperature of e.g. 50-220° C., preferably 90-220° C., most preferably 140-180° C.) when it is introduced in the reaction mixture of the first step and/or the second step.

Using the separated liquid (aqueous) phase from the second step (with or without oxidation) to feed it to the reaction mixture to be heated in step (i) has a number of benefits. For instance, the water content (and hence also the viscosity) of the reaction mixture in the first step can be optimally adjusted. Moreover, the heat included in the separated liquid phase can be reused in the process.

According to a preferred embodiment, the liquid phase of the reaction mixture in the second step is divided into two parts, one of which is recycled (with or without oxidation) to the first step for pH management, and the second of which is recycled (after oxidation) to the second step to make up for consumed polymerization initiator. As will be appreciated, the liquid phase from the second step may be subjected to the oxidation prior to dividing this into the above two parts. In addition, the caloric heat can be handled efficiently, when the respective parts of the liquid phase are recycled when still hot. As will be appreciated, the above recycling is particularly advantageous in a continuous flow system. Generally speaking, the above recycling allows for a minimization of side products and an optimization of the product yield in the hydrothermal carbonization process of the invention.

In relation to the general preparation process of the invention, the above two-step process, in which the first step is preferably characterized by higher temperature, shorter residence time, higher reaction viscosity (due to the raw biomass), and higher technical demands, and in which the second step is preferably characterized by comparably longer residence time, lower temperatures and pressures, and a more passive reaction handling also exhibits certain processing advantages.

Specifically, the reactor, in which the first step is to take place, which step, due to the preferably higher temperature and pressure, is more demanding from a process engineering point of view than the second, can be kept rather small, which is safer and moreover gives better heat transfer.

For instance, the reactor for carrying out the first step can be an extruder. Extruders allow very high pressures of up to 700 bars, temperatures of up to 400° C., are made for viscous starting materials, are regarded as very reliable and safe. Moreover, extruders allow effective and rapid heating and the injection of additional reactants at desired positions.

In a most preferable version, the temperature of the reaction mixture containing the activated biomass is reduced downstream, e.g. at the end of the extruder to the desired reaction temperature of the second step, making use of an efficient heat exchanger, and the heat is used for the preheating of the biomass to be subjected to the first step.

As lower temperature pressure can be employed in the second step due to the addition of the polymerization initiator, less demanding and safer constructions of the reactor(s) to be used in the second step are possible in that variant of the preparation process of the invention. As heat is produced throughout the hydrothermal carbonization process (it is a highly exothermic process) the reactor(s) for use in the second step—sufficient insulation provided—may not require further external heating and may be heated by recirculation of the cooling liquid of the first step.

Without restriction of generality, the second reaction step can be carried out in a cascade of smaller reactors, which improves the residence time within the second step and gives an improved hydrothermal, preferably coal-like, hybrid material.

Figure 3:
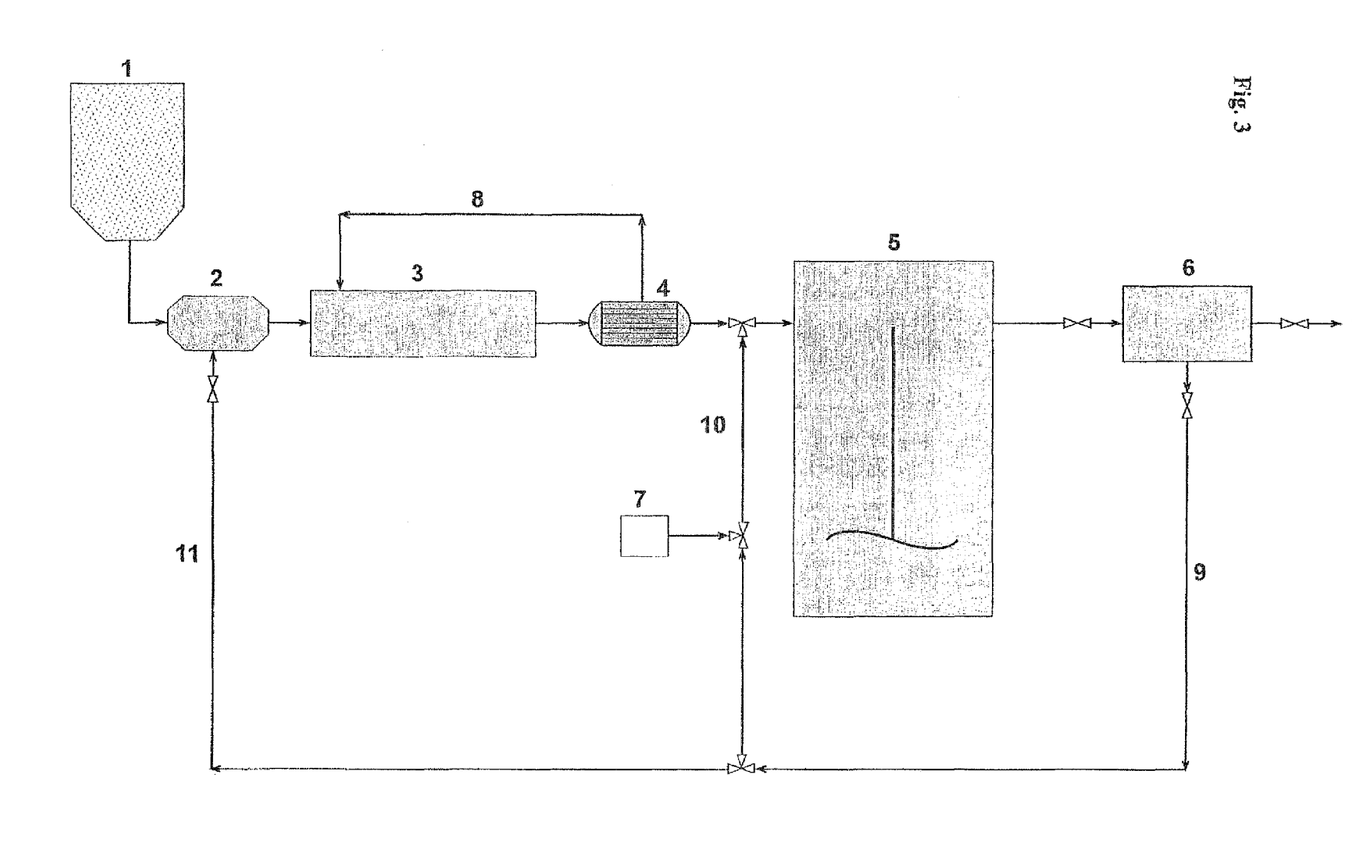
FIG. 3 provides a schematic flow diagram showing a preferred mode of continuously carrying out the two-step preparation process of the invention.

By reference to the appended FIG. 3, a preferred mode of carrying out the two-step preparation process of the invention will be illustrated. As can be seen, the process schematically shown in the flow diagram provided in the figure is a continuous process.

Reference numeral 1 denotes a (raw) biomass storage vessel. Preferably, the biomass contained in the vessel 1 has a suitable particle size, e.g. in the range of 0.1 to 20 mm. From the storage vessel 1, the biomass is fed to a mixing unit 2, to which copolymerizable compound(s) may be added (not shown). In the mixing unit 2, the biomass is mixed with the further ingredients such as copolymerizable compound, water and acid to give a reaction mixture. A stream 11 of the (aqueous) liquid phase separated in the separating unit 6 is recycled to the mixing unit 2 to provide at least part of the water and acid. According to a preferred embodiment, the stream of the aqueous liquid 11 (comprising acids) is mixed with the biomass in the mixing unit 2 without adding any further ingredients. Moreover, the separated liquid phase 11 preferably has a temperature of 140 to 220° C. The reaction mixture obtained in the mixing unit 2 is then transferred to the reactor 3 in which the step (i) is carried out. The reactor 3 is preferably an extruder as detailed above. The reaction temperature $T_1$ may be between 190 and 270° C. The reaction mixture comprising activated biomass and, optionally copolymerizable compounds obtained in the reactor 3 is then transported through a heat exchanger 4, from which the heat energy 8 can be recycled to the reactor 3. The reaction mixture comprising activated biomass leaving the heat exchanger 4 is transferred to the reactor 5 for carrying out the copolymerization step (ii). The reactor 5 is a pressure vessel, e.g. an autoclave. Preferably, it is provided with stirring means, which are schematically shown in the figure. The internal temperature in the reactor 5 may be between 140 and 220° C. To the reactor 5, a polymerization initiator and, optionally, copolymerizable compounds may be added from the external (not shown). In the alternative or in addition, oxidized aqueous liquid phase 10 separated in the separating unit 6 and containing suitable peroxides is fed along with the reaction mixture comprising activating biomass to the reactor 5. The reaction mixture comprising hydrothermal hybrid material obtained in the step (ii) is transferred from the reactor 5 to the separating unit (e.g. filtration unit) 6, in which it is separated into a solid phase of the hydrothermal hybrid material 12, and an (aqueous) liquid phase 9. In the continuous process illustrated in the figure, the liquid phase 9 is split into two parts. The first part is recycled as stream 11 (preferably having a temperature between 140 and 220° C.) to the mixing unit 2. The second part is oxidized by adding a suitable oxidizing agent from the oxidizing unit 7 to obtain species in the oxidized liquid phase 10 which can act as a polymerization initiator and can as such be recycled to the reactor 5 as detailed above.

The present invention will be further understood from the following examples, which are given by way of illustration and must not be construed in a limiting sense.

EXAMPLES

Example 1

6.0 g glucose is dissolved in 24.0 g water. 0.3 g acrylic acid (i.e. 5 wt % acrylic acid in terms of glucose) are added to obtain a reaction mixture. A 40 ml stainless steel autoclave is charged with the reaction mixture and heated to 200° C. for 12 h. The reaction is terminated by quenching. 3.0 g of the coal-like hybrid material is obtained. The material contains 63 wt % carbon. It is hydrophilic and has a strong ion-binding ability. An analysis of the water phase separated from the product does not show any significant amounts of acrylic acid. Consequently, the acrylic acid has been incorporated completely in the structure of the coal-like hybrid material.

Figure 1:
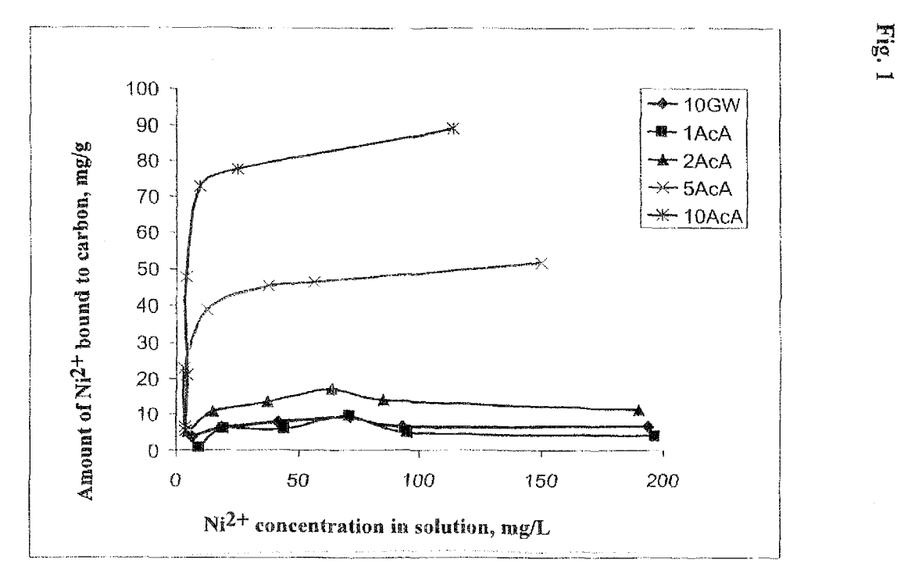
FIG. 1 is a graph showing the amount of $Ni^{2+}$ ions that can be bound by the coal-like materials as obtained in Example 1.

The product obtained was evaluated for the capability to bind certain ions. FIG. 1 shows the results of the ion-binding capability for $Ni^{2+}$ ions, as determined by ion-titration. In FIG. 1, the above coal-like hybrid material prepared by using a reaction mixture comprising 5 wt % acrylic acid in terms of glucose is denoted 5AcA.

The above procedure was repeated except for using different amounts of acrylic acid to obtain a homologous series of similar coal-like hybrid materials. Specifically, 1, 2, and 10 wt % acrylic acid with respect to glucose were used. FIG. 1 shows the ion-binding ability of these materials for $Ni^{2+}$ ions as determined via ion titration. Ion titration was performed according to standard procedures for activated carbons such as described by H. P. Boehm (Carbon 32 (1994), 759). The coal-like hybrid materials containing acrylic acid are labelled "XAcA" in FIG. 1, with X indicating the amount of acrylic acid (in wt % in relation to glucose) contained in the reaction mixture. The sample "10GW" was prepared as detailed above, except that no acrylic acid was added. As such, it serves as a comparative example.

As can be seen from FIG. 1, dependent on the amount of acrylic acid incorporated therein, the coal-like hybrid material according to the invention is capable of binding more than 8 wt % of nickel ions.

Example 2

200 g wood flour (saw dust) and 600 g water are formed into a slurry. Subsequently, 10 g arginine (Example 2a) is added, and the pH is adjusted to 6 using a phosphate buffer. An 1 L stainless steel autoclave (manufactured by Paar, Germany) equipped with an internal thermo element is charged with the reaction mixture and heated to 210° C. for 8 h. After cooling, the obtained coal-like hybrid material is recovered. It can be pulverized by hand and has lost the biotexture of the starting wood flour. As evidenced by streaming potential measurements, which were performed using a Mütek PCD03 Particle Charge Detector (Mütek Co, Arzberger Str, 10, 82211 Herrsching), the material has cationic surface charges.

To show the capability of the material to act as a flocculation agent, the sample is dispersed, and then combined with an anionic iron oxide sol (0.3 wt % in water) at a mass ratio of 1:1. Complete flocculation is observed.

The above preparation method is repeated except that the arginine was replaced with the same amounts of histidine (Example 2b), glycine (Example 2c) or taurine (Example 2d). In all cases, the obtained coal-like hybrid material can be pulverized by hand and has lost the biotexture of the starting wood flour.

For the material of Example 2b, it was verified by streaming potential measurements (using the same particle charge detector as mentioned above), that it has cationic surface charges.

The coal-like hybrid materials of Examples 2c and 2d was anionic and showed the typical ion-binding ability, e.g. for calcium, cadmium and lead ions.

In all of the above materials, the carbon content was between 62 and 64 wl %. Moreover, it was shown by analyzing the water phase of the mixture after separating the coal-like hybrid material, that the amino acids were incorporated in the coal-like hybrid material, practically completely.

Example 3

400 g wet cut grass and 50 g safflower oil are added to an 1 L stainless steel autoclave (manufactured by Paar, Germany) equipped with an internal thermo element. Water is added to 800 ml, and the reaction mixture is heated to 185° C. for 12 h. After cooling, an asphalt-like material can be recovered, which is capable of binding, and gluing water and hydrophilic minerals. The carbon content of the coal-like hybrid material after drying was 65%.

Example 4

6.0 g glucose is dissolved in 24.0 g water. 0.06 g vinyl imidazole is added, and citric acid is further added to adjust the pH to 5. The thus-obtained reaction mixture is filled in a 40 ml stainless steel autoclave, and heated to 200° C. for 12 h. The reaction is stopped by quenching. There is obtained 3 g of a coal-like hybrid material containing 63 wt % carbon. The material is hydrophilic and has a cationic surface potential.

Example 5

6.0 g glucose is dissolved in 24.0 g water, and 2.0 g phenol is added. After adjusting the pH to 4 by adding citric acid, the thus-obtained reaction mixture is filled in a 40 ml stainless steel autoclave, and heated to 190° C. for 12 h. The reaction is terminated by quenching. A very fine-particulate coal is obtained. It contains 70.9% carbon and 6.5% hydrogen. After drying, this coal is relatively hydrophobic and can be readily dispersed in organic solvents, such as toluene or mineral oil.

Example 6

Maleic anhydride was reacted with stoichiometric amounts of Jeffamine D2000® by simple heating to 80° C. for 4 h to obtain a maleic imide derivative. Then, Example 1 was repeated except that 0.3 g acrylic acid was replaced with 0.3 g of the maleic imide derivative obtained in the above synthesis. Very fine, partly porous particles were obtained with a particle size well below 1 μm.

Example 7

3.0 g glucose is dissolved in 20.0 g water, 30 mg acrylamidopropyl sulfonic acid (AMPS) (Example 7a) or 30 mg acrylonitrile (Example 7b) are added, and the mixture is adjusted with citric acid to pH 5, A 40 ml stainless steel autoclave is charged with the reaction mixture and heated to 190° C. for 12 h. The reaction is terminated by quenching. There is obtained a very fine aqueous dispersion of coal-like hybrid material, which is characterized by high stability and uniform particle size distribution.

Figure 2A:
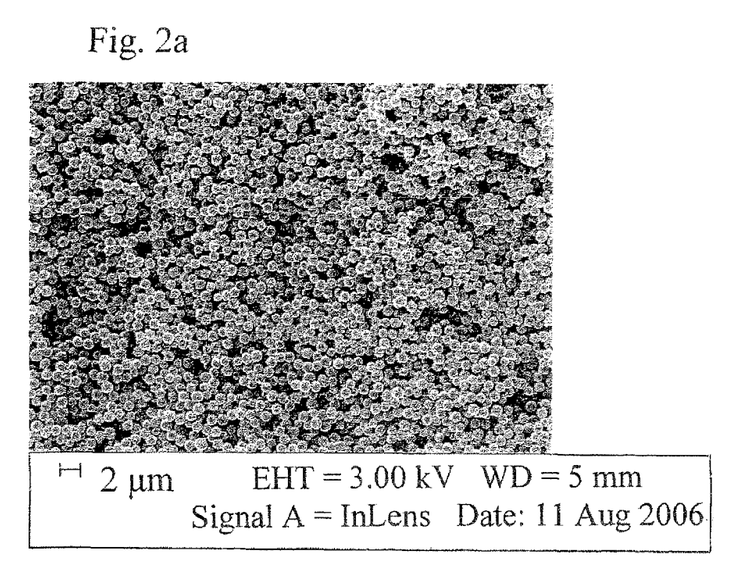
Figure 2B:
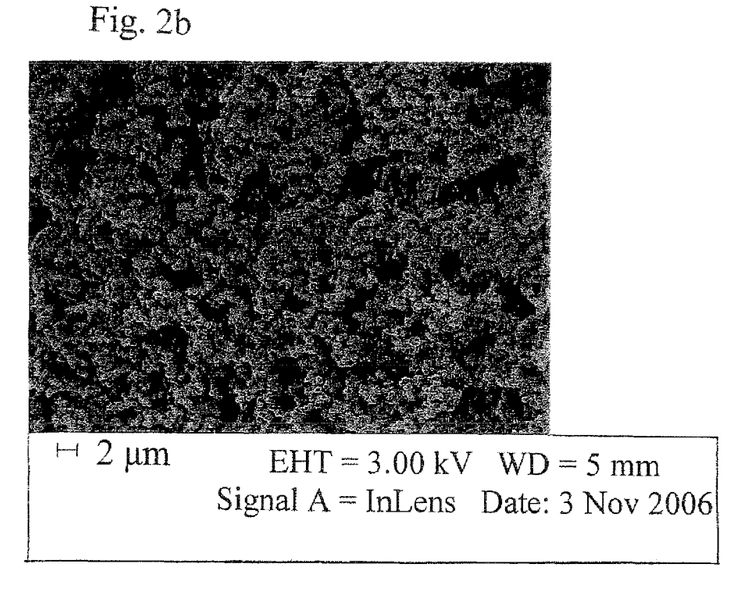

The aqueous dispersions obtained in Example 7a and 7b were subjected to SEM (scanning electron microscopy) analysis. The corresponding micrographs are shown in FIG. 2a (for Example 7a) and FIG. 2b (for Example 7b). As can be seen from FIG. 2, the aqueous dispersions obtained by using, as a biomass, glucose, and 1 wt % AMPS or acrylonitrile, are characterized by uniform particles of coal-like hybrid material of a particle size within the sub-micrometer range.

Example 8

25.0 g glucose is dissolved in 100.0 g water, and 2.5 g of diethanolamine are added, A 150 ml stirrable stainless steel reactor is charged with this mixture and heated to 190° C. for 12 h under stirring. The reaction is terminated by quenching to room temperature. A fine stable dispersion of carbon particles is obtained with particle diameters of around 100 nm, with all particles being smaller than 200 nm.

Example 9

25.0 g glucose is dissolved in 100.0 g water, and 2.5 g of polyvinyl alcohol (molecular weight 10000, 80% hydrolyzed, Aldrich Co.) and 0.150 g of Na-acrylamidopropylsulfonate are added. The reaction mixture is adjusted with citric acid to pH 5. A 150 nil stirrable stainless steel reactor is charged with this mixture and heated to 190° C. for 12 h under stirring. The reaction is terminated by quenching to room temperature. A fine stable dispersion of carbon particles is obtained with particle diameters of around 150 nm, with all particles being smaller than 300 nm.

The invention claimed is:

1. A hydrothermal carbonization process for the preparation of carbonized hydrothermal hybrid material from biomass comprising the step of heating a reaction mixture comprising water, biomass and a copolymerizable compound under hydrothermal conditions to obtain a mixture comprising carbonized hydrothermal hybrid material, characterized in that the copolymerizable compound is added when preparing the reaction mixture.

2. The process of claim 1, wherein the carbonized hydrothermal hybrid material is carbonaceous hybrid material.

3. The process of claim 1, wherein the biomass is raw biomass.

4. The process of claim 1, wherein the copolymerizable compound comprises a binding moiety capable of reacting with the biomass or activated biomass, the activated biomass being products of the disintegration and/or dehydration of the biomass, so as to be incorporated in the structure of the carbonized hydrothermal hybrid material.

5. The process of claim 4, wherein the copolymerizable compound further comprises at least one functional moiety.

6. The process of claim 5, wherein the functional moiety is selected from the group consisting of carboxyl, anhydride, phosphonate, sulfonic acid, sulfonate, imide, cyano, hydroxyl, guanidino, heterocyclic groups, amido, C8-24 alkyl and C8-24 alkylene groups, mono- to pentaethyleneglycol groups, and aromatic groups.

7. The process of claim 4, wherein said binding moiety is selected from the group consisting of an amino group, a carbonyl group, a phenolic hydroxyl group, and a carbon-carbon double bond.

8. The process of claim 1, wherein the copolymerizable compound is a petrochemical compound.

9. The process of claim 8, further comprising the step of separating the carbonized hydrothermal hybrid material from the obtained mixture.

10. A hydrothermal hybrid material obtainable by the process of claim 9.

11. The process of claim 1, wherein the copolymerizable compound is selected from the group consisting of (meth) acrylic acid, maleic anhydride, maleic imide derivatives, acrylamidoalkyl sulfonic acid and salts thereof, vinylphosphonate, glycine, taurine, phenols, acrylonitrile, dicyanamide and salts thereof, histidine, arginine, cationic peptides, vinylimidazole, vinylpyridine, alkanolamine, dialkanolamine, unsaturated fatty acids and fats, $C_{8-24}$ aldehydes, $C_{8-24}$ ketones and $C_{8-24}$ amines, $H_2N(C_2H_4O)_xH$, $H(OH_4C_2)_xNH(C_2H_4O)_yH$, wherein x and y are independently an integer of 1 to 5.

12. The process of claim 1, wherein the copolymerizable compound comprises a functional moiety, which is a surfactant residue.

13. A mixture obtainable by the process of claim 12, which is an aqueous dispersion of the hydrothermal hybrid material.

14. The process of claim 1, wherein the copolymerizable compound is selected from the group consisting of acrylonitrile, monoalkanol and dialkanol amines, and acrylamidoalkyl sulfonic acid and salts thereof.

15. The process of claim 14, wherein said monoalkanol and dialkanol amines are selected from monoethanolamine, diethanolamine, $H_2N(C_2H_4O)_xH$, and $H(OH_4C_2)_xNH(C_2H_4O)_yH$, wherein x and y are independently an integer of from 1 to 5.

16. The process of claim 14, wherein said acrylamidoalkyl sulfonic acid is selected from acrylamidopropyl sulfonic acid and salts thereof.

17. The process of claim 1, wherein said carbonized hydrothermal hybrid material is a coal-like hybrid material.

18. A hydrothermal carbonization process for the preparation of carbonized hydrothermal hybrid material from biomass comprising the following steps:
   (i) heating a reaction mixture comprising water and biomass to convert the biomass to activated biomass; and
   (ii) adding a polymerization initiator to the reaction mixture obtained in step (i) to copolymerize, under hydrothermal conditions, the activated biomass and a copolymerizable compound that is also present to obtain a mixture comprising carbonized hydrothermal hybrid material, wherein the copolymerizable compound is either included in the reaction mixture of step (i), and/or is included in step (ii).

* * * * *